Nov. 6, 1934. C. G. VRETMAN 1,979,590
PROCESS AND APPARATUS FOR CONDITIONING AIR IN REFRIGERATORS
Filed May 25, 1934 3 Sheets-Sheet 1
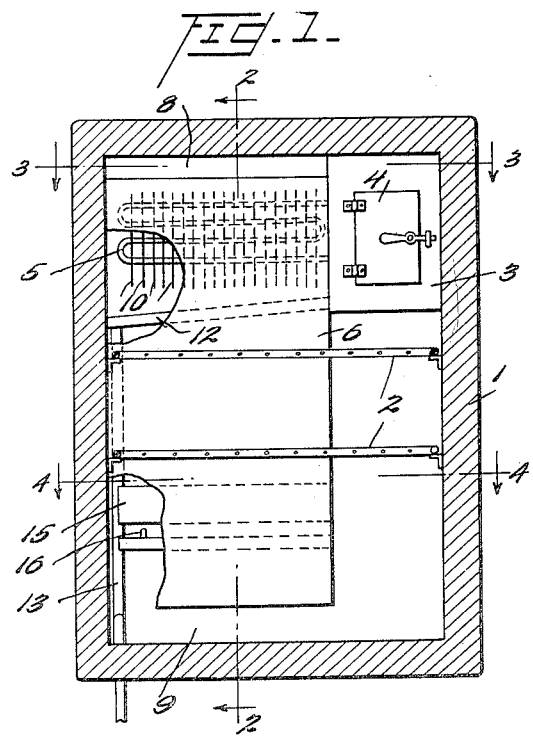
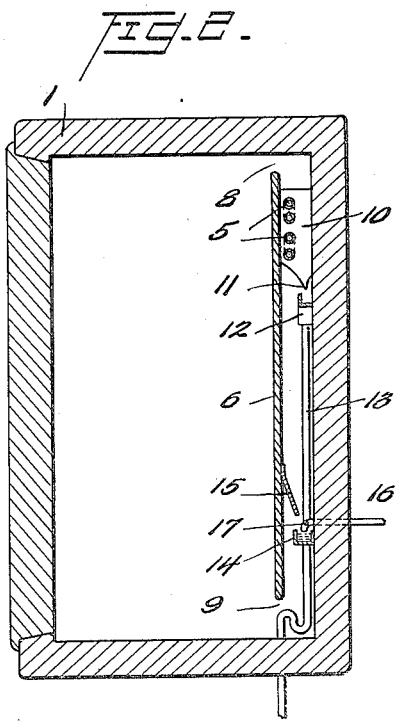
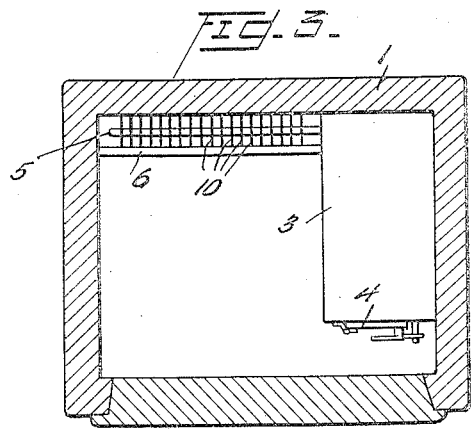
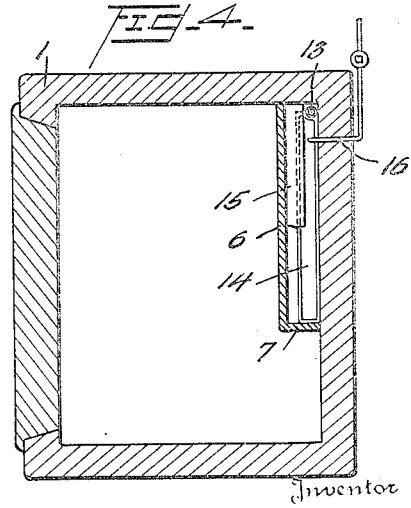
Inventor
Carl G. Vretman
Robert H. Young
Attorney Nov. 6, 1934. C. G. VRETMAN 1,979,590
PROCESS AND APPARATUS FOR CONDITIONING AIR IN REFRIGERATORS
Filed May 25, 1934 3 Sheets-Sheet 2
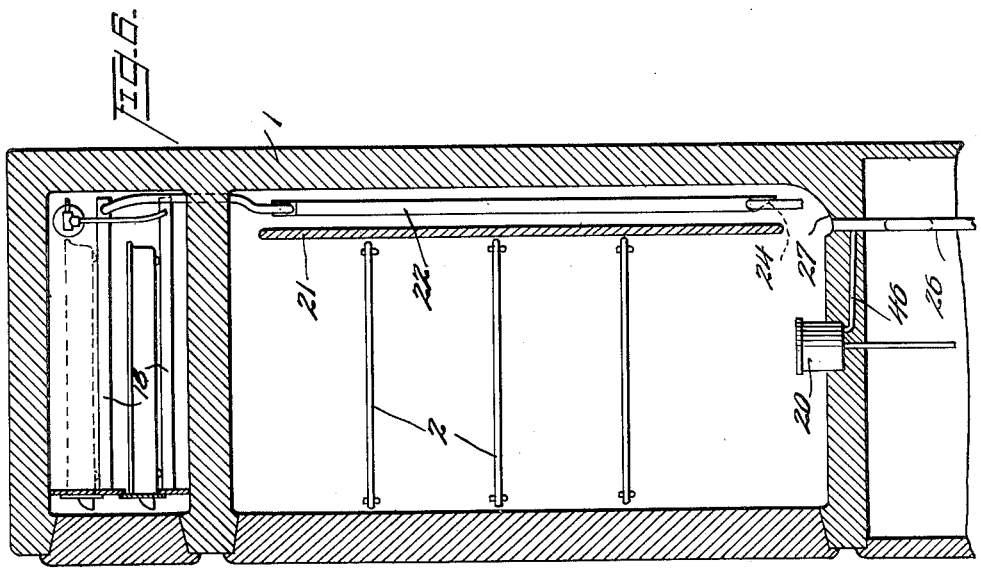
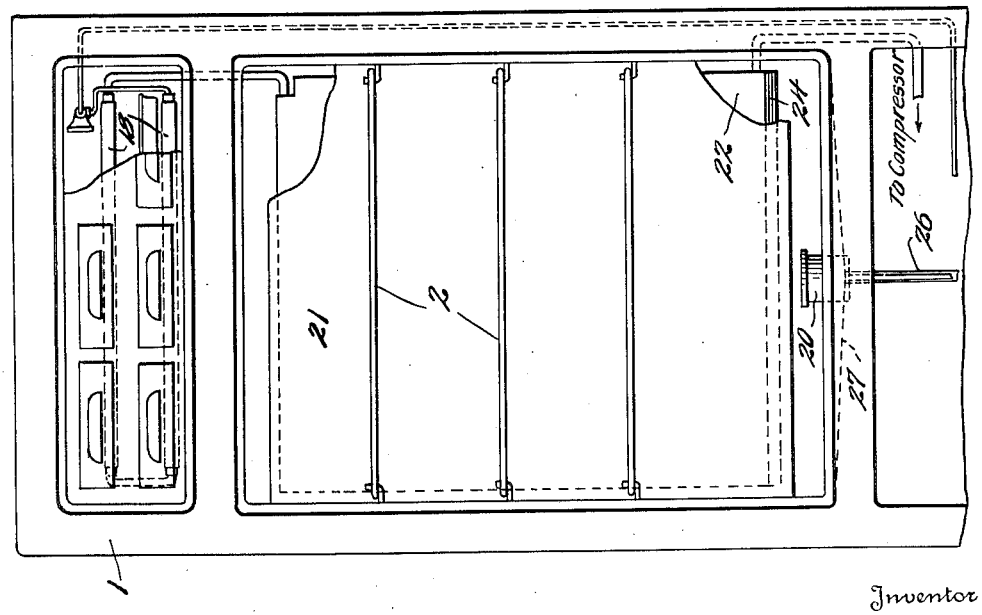
Inventor
Carl G. Vretman
Robert H. Young
By
Attorney Nov. 6, 1934. C. G. VRETMAN 1,979,590
PROCESS AND APPARATUS FOR CONDITIONING AIR IN REFRIGERATORS
Filed May 25, 1934 3 Sheets-Sheet 3
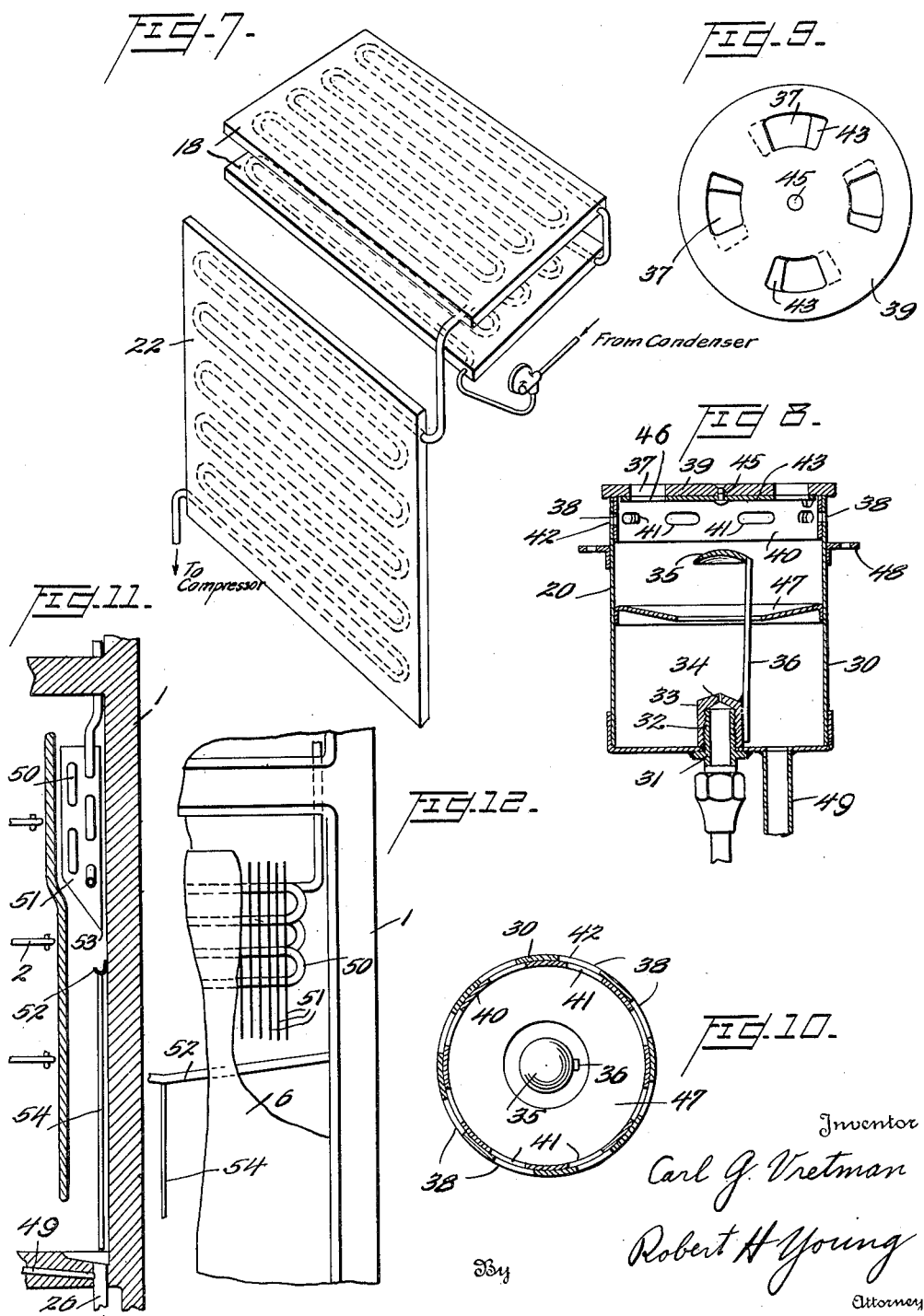

Patented Nov. 6, 1934

1,979,590

UNITED STATES PATENT OFFICE 1,979,590

PROCESS AND APPARATUS FOR CONDITIONING AIR IN REFRIGERATORS

Carl G. Vretman, Atlanta, Ga.

Application May 25, 1934, Serial No. 727,534

13 Claims. (Cl. 62—103)

This invention relates to improvements in apparatus and processes for conditioning air in refrigerators and particularly to improved embodiments of the invention disclosed in my prior application, Serial No. 700,715, filed December 2, 1933, of which this application is a continuation-in-part. The mechanical refrigerators previously in use have suffered from the serious drawbacks that the air has become very dry from precipitation of the moisture onto the refrigerating element whereby the food has become dried out and further that gases of the nature of odors and flavors exhaled by the food have accumulated and concentrated in the atmosphere in the refrigerator to such extent that the different foods have been contaminated with the odor or flavor of each other.

It is an object of this invention to overcome the above-mentioned difficulties by maintaining the atmosphere in the refrigerator continuously humid to prevent drying of the food and by extracting moisture containing the contaminating matter whereby the atmosphere is maintained clean and fresh.

A further object of this invention is to provide for a circulation of air at one portion of which a chilling of the air occurs which not only maintains the desired temperature in the refrigerator but precipitates out moisture containing the contaminating matter, and at a further portion of which fresh uncontaminated moisture is supplied to the air for the purpose of maintaining it humid and absorbing further contaminating matter to be removed from the refrigerator with the moisture upon again coming into contact with the chilling and precipitating means.

A further particular object of this invention is to humidify the air by projecting moisture therein in the form of an extremely fine mist or cloud, which has been found to be particularly effective for the absorption of contaminating gaseous matter of the nature of odors and flavors.

A further object of this invention is to provide means for removing the precipitated moisture from the refrigerator without permitting the absorbed contaminating gaseous matter to be returned to the circulating air.

Another object of this invention is to provide means in the circulating cycle of air in a position to humidify the air in advance of again contacting with the food in the refrigerator for supplying moisture in the form of fine mist to be carried into contact with the food and thence to the precipitating device.

A further object of this invention is to provide an improved form of atomizer for producing the fine mist and having means for adjusting the amount of said mist supplied.

In the accompanying drawings illustrating the several embodiments of this invention:

Fig. 1 is a vertical sectional view of a refrigerator in which the broad principle of this invention is embodied;

Fig. 2 is a side sectional view of Fig. 1 showing an arrangement of the chilling device and humidifying device and the means for removing the precipitated moisture from further contact with the air;

Fig. 3 is a horizontal sectional view on the line 3—3 of Fig. 1;

Fig. 4 is a horizontal sectional view on the line 4—4 of Fig. 1;

Fig. 5 is a front sectional view of an improved and preferred embodiment of the invention in which a vacuum plate chilling and precipitating device is employed and in which the moisture is supplied to the air at the bottom portion of the food compartment in the form of an extremely fine mist;

Fig. 6 is a side sectional view of Fig. 5 on the line 5—5 thereof;

Fig. 7 is a diagrammatic view showing the vacuum plate for cooling the food and precipitating the moisture and vacuum plates for freezing water and the connections therebetween;

Fig. 8 is a side sectional view showing an embodiment of a device for producing a fine mist or cloud of water to be supplied to the air passing to the food;

Fig. 9 is a plan view of Fig. 7 illustrating the adjustment of the supply of mist;

Fig. 10 is a horizontal sectional view of Fig. 8 on line 10—10 thereof;

Fig. 11 is a side sectional view partly broken away of a modified embodiment similar to that illustrated in Figs. 5 and 6 except that refrigerating coils and fins are employed in place of the vacuum plate; and Fig. 12 is a front sectional view partly broken away of the modified embodiment illustrated in Fig. 11.

In the embodiment of the invention illustrated in Figs. 1–4 of the drawings, numeral 1 refers to a box containing several shelves 2 and containing an ice freezing compartment 3 having coils (not shown) maintained cold by conventional compressor or gas apparatus (not shown and per se forming no part of this invention).

The walls of the ice freezing compartment are preferably of insulating material whereby the temperature in this compartment may be maintained much lower than the food compartment and the cooling of the food compartment is not dependent on the freezing coils of the ice compartment. The thorough insulation of the ice freezing compartment also prevents frosting on the outside of this compartment. The front of the ice compartment is provided with a hinged door 4 to further insulate the compartment and keep out the air of the food compartment, thus minimizing frosting of the freezing coils while allowing access to the ice when desired. The food compartment is maintained cold by a set of coils 5 preferably located at the back and toward the top of the food compartment. These coils are conveniently maintained cold by the same compressor or gas unit as the above-mentioned ice freezing coils and may be connected in series after the ice freezing coils or in parallel with the freezing coils, in which case each set of coils is preferably provided with a separate expansion valve and temperature control mechanism. By either of these arrangements the temperature in the ice compartment may be maintained below freezing while the temperature of the coils of the food compartment may be maintained above freezing. By such arrangement, deposition of ice on the freezing coils is avoided by isolation from the air, while ice on the food compartment coils cannot occur as their temperature is above freezing.

If desired, the size of the food compartment coils may be made smaller by using a lower temperature, even below freezing, in which case deposition of ice may occur, but since the coils are freely exposed to the atmosphere of the food compartment, the coils are automatically defrosted during each cut-out period.

Also if desired, the coils in the food compartment can simply be an extension of the ice freezing coils and connected so that the temperature in both sets of coils will be practically the same. It is apparent that in this case some frosting will occur on the part of the coils outside the ice compartment, but on account of the fins 10, the large heat transfer area thereby exposed to the atmosphere of the food compartment will automatically defrost the coils and fins during cut-out periods.

A partition plate 6 is disposed at the back of the food compartment but spaced from the rear wall. The food compartment cooling coils 5, previously mentioned, are positioned behind this partition 6. The partition plate does not extend the full height of the food compartment, but openings 8 and 9 at the top and bottom respectively are provided. At the side beneath the ice compartment the partition 6 is bent backwardly as at 7, thus completing the dividing off of an air treating compartment. The coils 5 may be provided with a plurality of fins 10 to increase the heat transfer from the air to the coils and to contact with a greater part of the air and to provide a greater surface upon which the moisture may deposit. These fins extend vertically and from front to back behind the partition 6, and the lower edges of the fins are formed pointed to provide drip points 11 for the moisture. Beneath these points a narrow trough or gutter 12 extends from the ice compartment to the opposite side and has an opening into a drain pipe 13. Upon contact with the coils and fins the air becomes cooled below its dew point and a substantial part of its moisture precipitates and is deposited on the coils and fins and runs down into the gutter and out of the refrigerator through the drain pipe. A great part of the odors and gases exhaled from the food are dissolved or absorbed in the precipitated moisture and also pass out with the moisture. Since the precipitated moisture is removed from further contact with the air immediately after precipitation, the possibility of recontamination by the same gases, odors or flavors is eliminated.

The cooled air in a somewhat purified and dried condition after contact with the cooling device passes downwardly by the influence of gravity and becomes somewhat warmer. In order not to cause excessive drying of the food, provision is made for replenishing the moisture content of the air with fresh clean gas-free water before return to the food compartment. To this end a humidifying device which may comprise water trough 14 extends across the lower portion of the air treating compartment and a baffle plate 15 directs the air against the water in the trough. As this plate 15 has a tendency to obstruct the air circulation, it may be omitted if desired. Water is supplied to the trough from a pipe 16 connected with the house mains. The humidifying device may be of any suitable kind and, as illustrated, may be simply the trough 14 and a spray provided by one or more fine perforations 17 in the sides of pipe 16. The water may be supplied as a drip, a fine spray, injected through an atomizer or in the form of steam, and preferably in excess of the quantity that will be taken up by the air. A conventional constant level overflow weir or the like may control the level in the trough and the excess flows off into drain pipe 13. The air in its cooled, purified and rehumidified condition then passes back to the food compartment through bottom opening 9.

In the improved embodiment of the invention illustrated in Figs. 5-10 inclusive, it has been found highly desirable that the moisture be supplied to the circulating air in the form of a fine mist or cloud and preferably at the point where the air is returned to the food compartment, that is, in such position that the air will become rehumidified before again contacting with the food, and in practice it has proven satisfactory to locate the humidifier 20 at the bottom of the food compartment, from which position the air moves upwardly into contact with the food. Behind a division plate 21 a vacuum cooling and precipitating plate 22 is provided. Vacuum plate 22 may be connected in series or parallel with freezing elements 18 located in freezing compartment 19 of the refrigerator box. This plate may extend vertically a substantial part of the height of the food compartment but its lower edge may terminate above the bottom, and in order to prevent splashing of contaminated precipitated water which may drip from the lower edge, a gutter or sump 27 at the bottom and back part of the box is provided with an upwardly curved rear portion merging into the back of the box. The gutter or sump 27 is drained by a drain pipe 26 whereby the contaminated precipitate is quickly conducted from the box without providing the opportunity for vaporization into the atmosphere of the box or giving off of the contaminating matter contained therein. Alternatively, the vacuum cooling plate may be provided with a gutter located beneath its lower edge to catch the precipitated contaminated water which may be conducted to sump 27 or drain pipe 26 by another drain pipe.

The particular form of humidifier shown in the embodiment comprises an atomizer having a casing 30 provided with a water pipe coupling 31 at its lower portion. This coupling has an upper portion extending within the casing and provided externally with screw threads 32 upon which a cap 33 is screwed. Cap 33 is provided with an extremely fine aperture 34 preferably directed upwardly and through which the water squirts in a very fine jet and impinges upon a target cup 35 supported from cap 33 by rod 36 and the water is thereby atomized into a very fine mist or cloud. The smaller or finer particles have considerable buoyancy and tend to pass upwardly and out of the casing through top or side apertures 37 or 38. The side apertures may be regulated by turning the casing cover 39 having a depending flange 40 provided with apertures 41 to more or less register with the side apertures 42 of the casing according to the position of adjustment whereby the size of apertures 38 is adjustable. The cover may also be provided with an adjustable plate 43 pivotally mounted inside the cover on pin 45, this plate also having apertures 46 to more or less register with the top apertures of the cover to provide adjustment of apertures 37. The upper end of pin 45 may be provided with a slot whereby it may be turned as with a screw driver to adjust plate 43 and apertures 37. The larger particles of water will tend to gravitate to the bottom of the casing and are discharged therefrom through a drain 49 connected to the drain pipe 26. The chamber formed inside casing 30 may be partially divided by an annular flange or baffle plate 47 which serves to favorably influence the buoyancy of the finer particles of the mist while permitting the larger particles to settle out underneath the plate away from the turbulence in the upper portion.

The atomizer casing may be secured in the bottom of the box by ears 48, with a greater part of the atomizer depressed in the bottom to decrease the obstruction to free use of the bottom for holding food. If desired, several of these humidifier devices may be provided in place of the single one illustrated.

If it is desired to employ coils for cooling the air and precipitating the moisture in place of the vacuum plate, as illustrated in Figs. 11 and 12, these coils 50 are preferably provided with fins 51 for increasing the surface of contact. If coils are provided, they need not extend into close proximity with the bottom of the box, but in this case a small gutter 52 may be provided for catching the moisture precipitated and flowing from downwardly extending points 53 of the fins. The gutter preferably slopes to the center from both ends, and a drain pipe 54 extends from the low point to the drain pipe 26 at the bottom of the box and the contaminated moisture is thereby discharged from the box without any substantial contact with the circulating air by which the contaminating matter could be returned thereto. The refrigerator according to this invention is preferably provided with a humidifying device similar to that described in connection with Figs. 5–10 or with any other suitable humidifier. Except as above indicated, this embodiment may be similar to the embodiment disclosed in Figs. 5–10. The use of the gutter 52 and drain pipe 54 is not limited to embodiments in which coils and fins are used, but may also be employed for catching the drip from the bottom edge of vacuum plates which may terminate at substantial distance from the bottom of the box and conducting the water to the sump or drain pipe 26.

I claim:

1. In apparatus for conditioning air in refrigerators, means for chilling the air and precipitating contaminated moisture therefrom, means for removing the precipitated moisture from the refrigerator out of contact with the air to prevent reintroduction of the contaminating matter into the air, and means for supplying the dried and purified air with fresh uncontaminated moisture in the form of mist.

2. In apparatus for conditioning air in refrigerators, a box, means providing a circulation of the air in said box, means for chilling the air and precipitating contaminated moisture therefrom, means for removing the precipitated contaminated moisture from the refrigerator box to prevent reintroduction of the contaminating matter into the circulating air, and means for supplying the circulating air with fresh uncontaminated moisture in the form of an extremely fine mist or cloud.

3. In apparatus for conditioning air in refrigerators, a box for containing food, partition means dividing off a portion of said box, said partition leaving an opening at the top and bottom for air flow between the box and the divided-off portion thereof, means behind said partition for chilling the air and precipitating moisture containing contaminating matter therefrom, means for removing the precipitated moisture from the box without substantial temperature increase and out of contact with the air to prevent reintroduction of the contaminating matter into the air, and means for supplying the dried and purified air with fresh moisture in the form of mist.

4. In a refrigerator, a box, partition means dividing said box into a food compartment and an air treating compartment, the partition means providing an opening at the upper portion of the box and an opening at the lower portion for flow of air, means in said air treating compartment for cooling the air and precipitating moisture therefrom, means for conducting the precipitated moisture out of the box, and means for rehumidifying the air with fresh moisture in the form of a fine mist before further contact with the food.

5. In apparatus for conditioning air in refrigerators, a box, means providing a circulation of the air in said box, means for chilling the air and precipitating contaminated moisture therefrom, means for removing the precipitated contaminated moisture from the refrigerator box to prevent reintroduction of the contaminating matter into the circulating air, and means for supplying the circulating air with fresh uncontaminated moisture in the form of an extremely fine mist or cloud, said moisture supplying means being located at the lower portion of the box.

6. In apparatus for conditioning air in refrigerators, a box, means providing a circulation of the air in said box, means for chilling the air and precipitating contaminated moisture therefrom, means for removing the precipitated contaminated moisture from the refrigerator box to prevent reintroduction of the contaminating matter into the circulating air, and an atomizing device countersunk in a recess in the bottom of the box for supplying the circulating air with fresh uncontaminated moisture in the form of a fine mist.

7. In a refrigerator, a box, partition means dividing said box into a food compartment and an air treating compartment, the partition means providing an opening at the upper portion of the box and an opening at the lower portion for flow of air, a vacuum plate in said air treating compartment for cooling the air and precipitating moisture therefrom, means for conducting the precipitated moisture out of the box, and means for rehumidifying the air with fresh moisture in the form of a fine mist before further contact with the food.

8. In a refrigerator, a box, partition means dividing said box into a food compartment and an air treating compartment, the partition means providing an opening at the upper portion of the box and an opening at the lower portion for flow of air, the bottom of the box being provided with a sump at its rear, means in the air treating compartment above the sump for cooling the air and precipitating moisture therefrom, means for conducting the precipitated moisture from the sump out of the box, and means for rehumidifying the air with fresh moisture in the form of a fine mist before further contact with the food.

9. In a refrigerator, a box, partition means dividing said box into a food compartment and an air treating compartment, the partition means providing an opening at the upper portion of the box and an opening at the lower portion for flow of air, the bottom of the box being provided with a sump at its rear, a vertically disposed vacuum plate in the air treating compartment extending downwardly into close proximity to the sump for chilling the air and precipitating contaminated moisture therefrom whereby the precipitated moisture passes from the vacuum plate to the sump without splashing and extensive contact with the air, a drain for conducting the moisture from the sump out of the box, and a humidifier at the lower portion of the box for supplying fresh moisture to the air in the form of a fine mist.

10. In a refrigerator, a box, partition means dividing said box into a food compartment and an air treating compartment, the partition means providing an opening at the upper portion of the box and an opening at the lower portion for flow of air, the bottom of the box being provided with a sump at its rear, a vertically disposed vacuum plate in the air treating compartment extending downwardly into close proximity to the sump for chilling the air and precipitating contaminated moisture therefrom whereby the precipitated moisture passes from the vacuum plate to the sump without splashing and extensive contact with the air, a drain for conducting the moisture from the sump out of the box, a humidifier at the lower portion of the box for supplying fresh moisture to the air in the form of a fine mist, said humidifier having means for comminuting water into fine particles, means for collecting the larger particles and a drain for conducting the collected water to said first-mentioned drain.

11. In a refrigerator, a box, partition means dividing said box into a food compartment and an air treating compartment, the partition means providing an opening at the upper portion of the box and an opening at the lower portion for flow of air, the bottom of the box being provided with a sump at its rear, means in the air treating compartment for cooling the air and precipitating contaminated moisture therefrom, means for conducting the precipitated moisture from the precipitating means to the sump out of contact with the air, a drain for conducting the moisture from the sump out of the box, and a humidifier at the lower portion of the box for supplying fresh moisture to the air in the form of a fine mist.

12. In a refrigerator, a box, insulating means dividing said box into a freezing compartment and a food and air treating compartment, a refrigerating element in the freezing compartment, means connected with said refrigerating element for cooling the air in the air treating compartment and precipitating moisture therefrom, means for conducting the precipitated moisture out of the box out of contact with the air, and means for supplying the dried air with fresh moisture in the form of mist.

13. The method of conditioning air in refrigerators comprising circulating the air in the refrigerator, chilling the air at one portion of the cycle and thereby precipitating contaminated moisture therefrom, removing the precipitated moisture from the refrigerator without returning the contaminating matter to the circulating air, and thereafter introducing further moisture in the form of extremely fine mist or a cloud to prevent drying of the food and to absorb further contaminating matter.

CARL G. VRETMAN.